US008938265B1

(12) United States Patent
Oroskar (10) Patent No.: US 8,938,265 B1
(45) Date of Patent: Jan. 20, 2015

(54) DYNAMIC PER-TYPE CONCATENATION OF PAGING-CHANNEL MESSAGES

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 282 days.

(21) Appl. No.: 13/585,616

(22) Filed: Aug. 14, 2012

Related U.S. Application Data (63) Continuation-in-part of application No. 12/699,273, filed on Feb. 3, 2010, now Pat. No. 8,565,792.

(51) Int. Cl.
*H04W 68/02* (2009.01)
*H04W 72/00* (2009.01)
*H04B 7/00* (2006.01)
*H04H 20/71* (2008.01)

(52) U.S. Cl.
USPC ............ 455/458; 455/453; 455/515; 370/312

(58) Field of Classification Search
CPC ....... H04W 68/04; H04W 4/08; H04W 68/02; H04W 68/025; H04W 72/12; H04W 28/0289; H04W 28/065; H04W 68/00; H04W 68/08; H04B 7/2125
USPC ............................ 455/453, 458, 515; 370/312
See application file for complete search history.

(56) References Cited

U.S. PATENT DOCUMENTS

| | | | |
|---|---|---|---|
| 5,537,100 A * | 7/1996 | Hallberg | 340/7.38 |
| 6,058,308 A * | 5/2000 | Kallin et al. | 455/432.3 |
| 6,539,003 B1 * | 3/2003 | Agarwal et al. | 370/324 |
| 6,731,943 B1 * | 5/2004 | McCormick et al. | 455/458 |
| 7,499,418 B2 * | 3/2009 | Oprescu-Surcobe et al. | 370/311 |
| 8,203,963 B1 * | 6/2012 | Oroskar et al. | 370/252 |
| 8,355,740 B1 * | 1/2013 | Oroskar et al. | 455/458 |
| 8,521,195 B1 * | 8/2013 | Oroskar et al. | 455/458 |
| 8,565,792 B1 * | 10/2013 | Vargantwar et al. | 455/458 |
| 2002/0123365 A1 * | 9/2002 | Thorson et al. | 455/524 |
| 2002/0197992 A1 * | 12/2002 | Nizri et al. | 455/435 |
| 2004/0131075 A1 * | 7/2004 | Sinnarajah et al. | 370/431 |
| 2006/0068802 A1 * | 3/2006 | Benco et al. | 455/452.1 |
| 2006/0251033 A1 * | 11/2006 | Oprescu-Surcobe et al. | 370/338 |
| 2007/0153719 A1 * | 7/2007 | Gopal | 370/328 |
| 2008/0130609 A1 * | 6/2008 | Lee et al. | 370/342 |
| 2008/0268877 A1 * | 10/2008 | Harris | 455/458 |
| 2009/0129265 A1 * | 5/2009 | Ye et al. | 370/230 |
| 2009/0181701 A1 * | 7/2009 | Willey et al. | 455/458 |
| 2011/0019721 A1 * | 1/2011 | Diener et al. | 375/219 |
| 2011/0151884 A1 * | 6/2011 | Zhao | 455/452.1 |
| 2014/0018088 A1 * | 1/2014 | Vargantwar et al. | 455/450 |

* cited by examiner

*Primary Examiner* — Matthew Sams (57) ABSTRACT

Methods and systems are disclosed that may help to adjust concatenation of a particular type of paging-channel message, based on the paging-channel occupancy of that particular type of message. An exemplary method may involve: (a) determining a message-type paging channel occupancy (PCO) for a first of the plurality of types of paging-channel messages in the coverage area, (b) using the message-type PCO as a basis for selecting a concatenation level to be used in the coverage area for the first type of paging-channel message, where the concatenation level is selected from a plurality of possible concatenation levels, and (c) applying concatenation according to the selected concatenation level to paging-channel messages of the first type in the coverage area.

17 Claims, 5 Drawing Sheets

DYNAMIC PER-TYPE CONCATENATION OF PAGING-CHANNEL MESSAGES

RELATED APPLICATION

This application is a continuation-in-part of U.S. patent application Ser. No. 12/699,273, filed on Feb. 3, 2010, entitled "Dynamic Paging Concatenation," the contents of which are incorporated by reference herein for all purposes.

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet. When a mobile station, such as a cellular telephone, pager, or wirelessly-equipped computer, is positioned in a cell, the mobile station communicates via an RF air interface with the base station antennae of a cell. Consequently, a communication path can be established between the mobile station and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by mobile stations in the coverage areas and orchestrating handoff of calls between coverage areas. In turn, a switch and/or gateway may control one or more base station controllers and generally control wireless communications, by performing functions such as receiving and processing call requests, instructing base station controllers when to assign traffic channels, paging mobile stations, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may define an air interface "access channel" on which mobile stations can send "access probes" seeking to originate calls (e.g., voice calls, data sessions, and/or other "calls") or seeking to register their presence in the sector. Further, each sector may define an air interface "paging channel" on which the serving base station can page a mobile station. For example, paging channel may be used to send access probe acknowledgements and traffic channel assignment messages to served mobile stations. The paging channel also defines timeslots in which the base station can send various messages to particular mobile stations. For instance, if an access probe is received from one mobile station seeking to connect to a second mobile station, the base station may send a page via the paging channel to notify the second mobile station of the incoming call.

If a base station has numerous such messages to send, however, the paging channel can become congested, which may delay call setup or even result in a page not reaching the intended mobile station. Accordingly, in a further aspect of existing CDMA access networks, base station commonly group a certain number of pages (that are typically intended for different mobile stations) into a common page message for transmission via the paging channel. Furthermore, to conserve bandwidth, and so that more pages can be transmitted per timeslot, each page in a page message may be concatenated.

OVERVIEW

Concatenating pages so that they can be included in a common page message has certain drawbacks. For example, since some information is inevitably lost through concatenation, the probability of a mobile station receiving a page may decrease due to concatenation of the page. This may be particularly problematic when paging channel resources are being heavily utilized, and congestion on the paging channel therefore increases the probability that a page will not reach the intended mobile station. Therefore, it may be desirable to intelligently determine when concatenation is or is not likely to be beneficial, and dynamically adjust concatenation by, e.g., adjusting how much concatenation is performed and/or turning on and off a concatenation feature.

Further, there may be some scenarios where it is desirable to apply more concatenation to one type of page message than to another type. Accordingly, exemplary embodiments may involve a radio access network (RAN) dynamically invoking and/or adjusting the amount of concatenation of a particular type of paging channel message based on the paging-channel for that particular type of message. For example, concatenation may be applied or increased in a given sector, for a particular type of paging-channel message, in response to a determination that more than a threshold extent of paging-channel capacity (e.g., of used paging channel capacity, or total paging channel capacity) is being used or is scheduled to be used for that type of message.

As a specific example, an embodiment may be implemented to dynamically adjust concatenation for feature notification messages (FNMs) at a paging zone border in a RAN. In particular, FNMs may be sent in response to mobile stations registering with the RAN, and registration often occurs when a mobile station crosses into a sector in a new paging zone (i.e., at a sector that is at a paging zone border). Therefore, the utilization of paging channel resources for FNMs, relative to other types of paging-channel messages, may be may be higher in a paging-zone border sector than in other sectors. Accordingly, an exemplary method may be implemented to determine the paging channel occupancy (PCO) specifically for FNMs, in a given sector, and to adjust the concatenation level for FNMs in the sector accordingly. By doing so, concatenation may be increased when in sectors where the page-type PCO for FNMs is high, such as in a border sector, but not increased or disabled in other sectors. Further, an exemplary method may allow for concatenation to be enabled and/or increased only for FNMs, and not for other types of page messages.

In one aspect, an exemplary method involves a RAN (e.g., a component or components of a RAN), which is operable to send a plurality of types of messages via a paging channel in a coverage area: (a) determining a message-type paging channel occupancy (PCO) for a first of the plurality of types of paging-channel messages in the coverage area; (b) using the message-type PCO as a basis for selecting a concatenation level to be used in the coverage area for the first type of paging-channel message, wherein the concatenation level is selected from a plurality of possible concatenation levels; and (c) applying concatenation according to the selected concatenation level to paging-channel messages of the first type in the coverage area.

In another aspect, a non-transitory computer readable medium has stored therein instructions that are executable to cause a RAN component, which is operable to send a plurality of types of messages via a paging channel in a coverage area, to perform functions including: (a) determining a message-type paging channel occupancy (PCO) for a first of the plurality of types of paging-channel messages in the coverage area; (b) using the message-type PCO as a basis for selecting a concatenation level to be used in the coverage area for the first type of paging-channel message, wherein the concatenation level is selected from a plurality of possible concatenation levels; and (c) applying concatenation according to the selected concatenation level to paging-channel messages of the first type in the coverage area.

In a further aspect, a system may be implemented in a RAN that is operable to send a plurality of types of messages via a paging channel in a coverage area. The system may include a non-transitory computer readable medium and program instructions stored on the non-transitory computer readable medium. The program instructions may be executable by at least one processor to: (a) determine a message-type paging channel occupancy (PCO) for a first of a plurality of types of paging-channel messages in a coverage area of a radio access network (RAN), wherein the RAN is operable to send the plurality of types of paging-channel messages via a paging channel in the coverage area; (b) use the message-type PCO as a basis to select a concatenation level to be used in the coverage area for the first type of paging-channel message, wherein the concatenation level is selected from a plurality of possible concatenation levels; and (c) apply concatenation according to the selected concatenation level to paging-channel messages of the first type in the coverage area.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Referring to the drawings, as noted above, FIG. 1 is a simplified block diagram of a wireless communication network in which an exemplary method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

Figure 1:
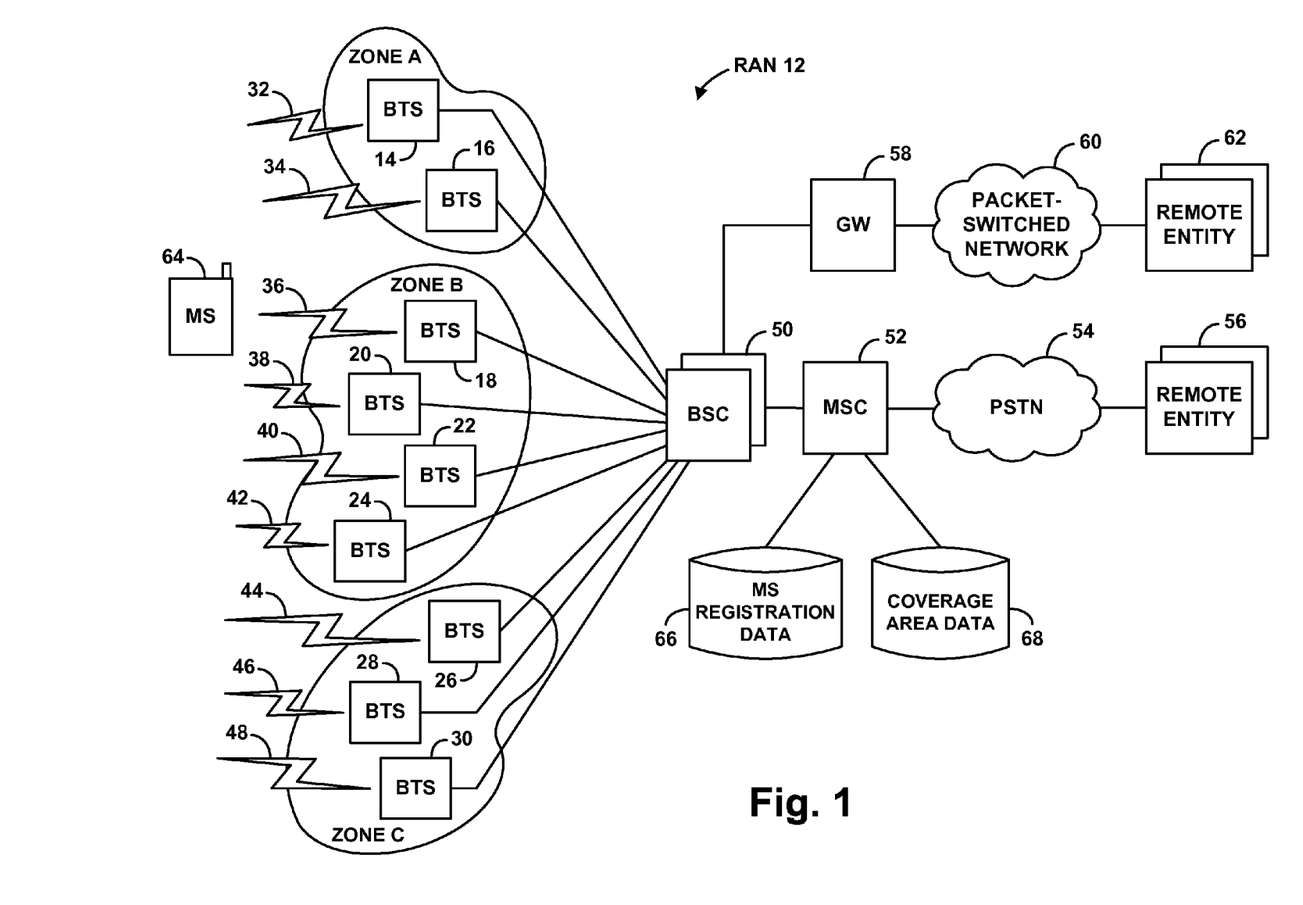
FIG. 1 is a simplified block diagram of a wireless communication network in which an exemplary method can be implemented.

As shown in FIG. 1, the exemplary network includes at its core a radio access network (RAN) 12 that radiates to define numerous coverage areas in which mobile stations can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served mobile station can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas 32-48 as shown and to communicate with mobile stations in those coverage areas.

The coverage areas shown in the figure can be cell sites, cell sectors, or some other defined wireless coverage area (possibly even a combination of coverage provided by multiple base stations). For simplicity, just a single coverage area is shown emanating from each base station, but it is further understood that a typical base station may provide multiple discrete coverage areas, such as multiple cell sectors for instance.

Each base station controller may be coupled with one or more switches, such as a mobile switching center (MSC) 52, which provides connectivity with the public switched telephone network (PSTN) 54, so that served mobile stations can communicate with remote entities 56 on the PTSN. Additionally or alternatively, each base station controller may be coupled with one or more gateways, such as packet data serving node (PDSN) 58, which provides connectivity with a packet-switched network 60, so that served mobile stations can communicate with remote entities 62 on the packet-switched network.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. Further, it should be understood that actions that are generally described as being carried out by the RAN (or simply by the "network" or a "wireless communication network") may be carried out by various different entities or combinations of entities in the RAN, possibly in conjunction with other entities in communication with the RAN. It should also be understood that features and functionality described in reference to one network entity or combination of entities, such as a BTS, BSC, MSC, and/or PDSN, may also be carried out by other entities without departing from the scope of the invention. Yet further, note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

FIG. 1 depicts a representative mobile station 64 by way of example, which could be a cell phone, wirelessly equipped personal digital assistant (PDA), or any other type of wirelessly-equipped device now known or later developed. The mobile station is preferably equipped with hardware, software, and/or other logic to communicate with RAN 12 in accordance with an agreed communication protocol, such as one of the protocols noted herein for instance. For example, in an exemplary embodiment, mobile station 64 includes a wireless communication interface that functions to facilitate air interface communication with RAN 12 according to one or more protocols such as those noted above. Further, mobile station may include a user interface, which typically includes components for receiving input from a user of mobile station and providing output to a user of the mobile station. Yet further, mobile station 64 may include program logic stored in data storage (e.g., one or more volatile and/or non-volatile storage components of the mobile station, such as magnetic, optical, or organic storage components) and executable by one or more processors (e.g., general purpose and/or special purpose processors) to carry out various functions described herein.

Each mobile station, such as mobile station 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN).

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

Figure 2:
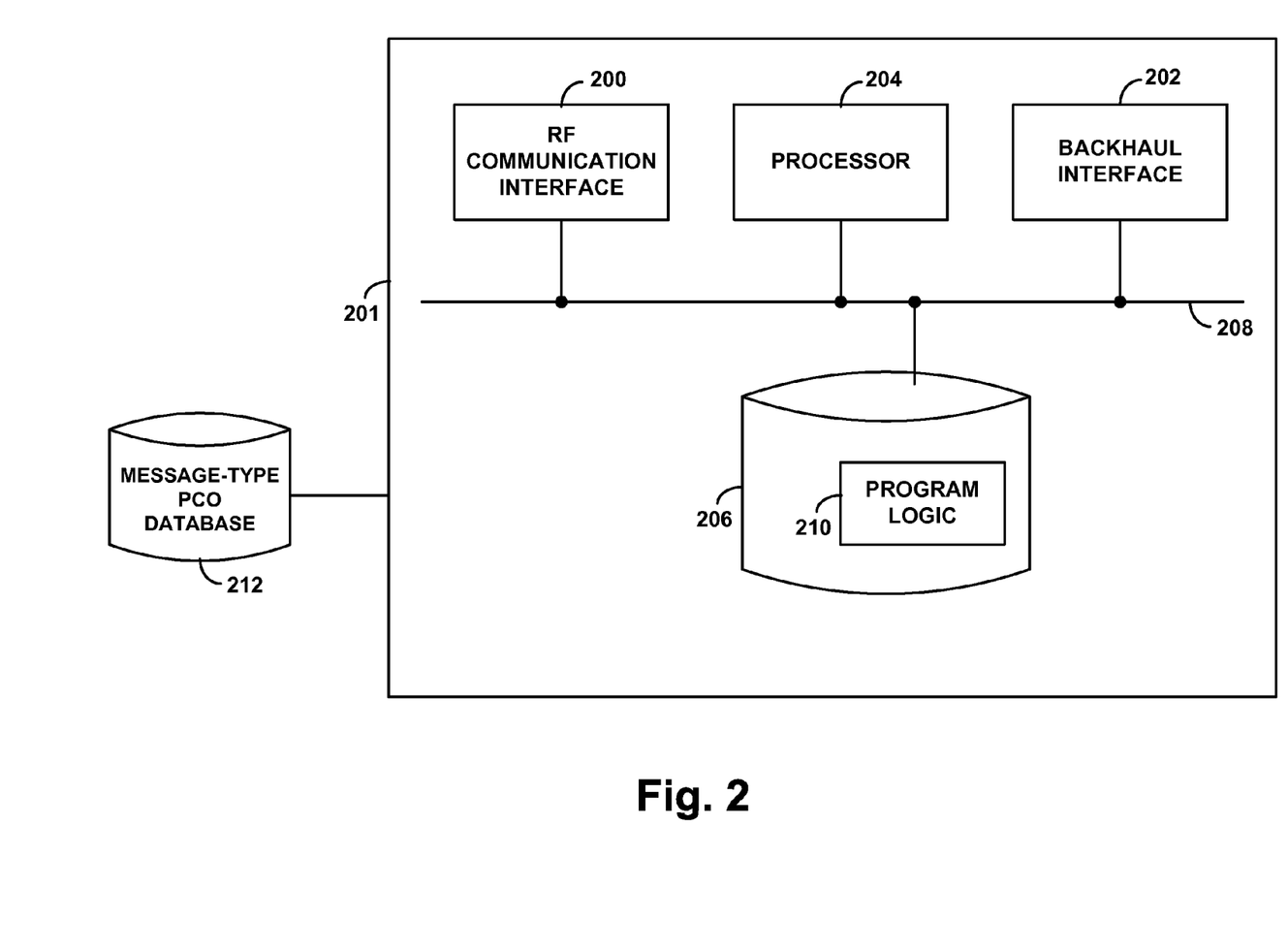
FIG. 2 is a simplified block diagram showing functional components of a system configured to help manage paging-channel resources in a radio access network, according to an exemplary embodiment.

FIG. 2 is a simplified block diagram showing functional components of a system configured to help manage paging-channel resources in a RAN (i.e., usage of paging-channel bandwidth), according to an exemplary embodiment. In the embodiment shown in FIG. 2, the system is shown as taking the form of a RAN component 201, which could be a base station or a switch, for example. As shown, the RAN component 201 may include an RF communication interface 200, a backhaul interface 202, a processor 204, and data storage 206, all of which may be communicatively linked together by a system bus, network, or one or more other connection mechanisms 208.

In practice, RAN component 201 may take the form of or include one or more BTS and/or a BSC, such as BTSs 18-24 and/or BSC 50 for instance, or may take the form of a switch, such as MSC 52. Accordingly, the illustrated components of RAN component 201 (e.g., communication interface 200, a backhaul interface 202, a processor 204, and data storage 206) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

In RAN component 201, RF communication interface 200 may comprise one or more antenna structures, one or more power amplifiers, and associated equipment, for engaging in RF communication with mobile stations operating within the base station's coverage, according to one of the air interface protocols noted above for instance. Backhaul interface 202 may comprise any sort of communication link or mechanism enabling the base station to exchange signaling and bearer data with other RAN entities, such as with MSC 52 for instance. Processor 204 may comprise one or more processors (e.g., general purpose and/or special purpose processors), such as microprocessors for instance. And data storage 206 may comprise one or more volatile and/or non-volatile storage components, such as magnetic, optical, or organic storage components, integrated in whole or in part with processor 204. As further shown, data storage 206 preferably contains program logic 210 (e.g., machine language instructions) executable by processor 204 to carry out various functions, such as the functionality of the exemplary methods and systems described herein.

Referring again to FIG. 1, when RAN 12 seeks to page a mobile station 64 (e.g., for an incoming call or for some other reason), a switch, such as MSC 52, may send a page to numerous base stations in the switch's coverage area, such as BTSs 18-24, with the hope that when the base stations broadcast the page message, the mobile station will receive the page message in one of the associated sectors, and will respond. Given the scarcity of paging channel resources, however, most modern cellular networks are instead arranged to engage in a more targeted paging process known as "zone-based paging."

With zone-based paging, a cellular network is divided into paging zones, each with a respective zone ID, and paging is performed on a zone-basis. To facilitate this, each base station in the system may broadcast as one of its overhead parameters the zone ID for the zone in which the base station is located. Mobile stations operating in the network may then programmatically monitor the zone IDs indicated in the overhead messages and may automatically register with the network when they detect that they have moved into a new zone, or for other reasons. To register with the network, a mobile station may send a registration message via the access channel in its current sector, and a switch in the network would note the mobile station's registration and convey an indication of the registration to a home location register for later reference.

With this process, the registration records thereby maintained by switches and/or home location registers will indicate the paging zone in which each mobile station last registered. When a switch seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone. Once the designated base stations transmit the page message, if the mobile station does not respond to the page, the switch may then broaden the scope of the page, by sending the page message to a wider range of paging zones and perhaps ultimately to all base stations in the switch's serving area.

Using the general paging strategy that is implemented in many wireless access networks, the network may make up to three attempts to page a mobile station. In particular, the network may first attempt to transmit a page record in the paging zone in which the mobile station is registered (i.e., the base stations in the paging zone in which the mobile station is registered transmit the page record). Then, if the first attempt is unsuccessful (i.e., the mobile station does not acknowledge the page record), the network makes a second attempt to page the mobile station by again transmitting the page record in the paging zone in which the mobile station is registered, and possibly in adjacent zones as well. If the second attempt also fails, then the network makes a third attempt to page the mobile station, which typically involves a system-wide transmission of the page record (i.e., in all paging zones), although it is possible that a third attempt may be of a different scope as well.

As shown in FIG. 1, the base stations are grouped into zones A, B, and C to facilitate zone-based paging as described above. In particular, each base station may broadcast a zone ID indicating its zone, and a mobile station such as mobile station 64 may monitor the zone IDs broadcast in the coverage areas where the mobile station is operating. When the mobile station detects a change in zone ID, the mobile station may then responsively register its presence in the new zone, so that the RAN would then know to page the mobile station in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to mobile station registration data 66. The mobile station registration data 66 preferably comprises data that specifies per mobile station where the mobile station is currently registered, such as the zone in which the mobile station is currently registered, among possibly other information. More specifically, the mobile station registration data 66 may take the form of a visitor location register (VLR) database, which holds a record per mobile station in the MSC's service area. The mobile station's current zone of registration can thus be indicated in the mobile station's VLR record. Alternatively or additionally, the mobile station registration data can take the form of a home location register (HLR) database 70 that is accessible via the MSC 52. Still alternatively, the data may be stored internally at the MSC and/or base stations, or elsewhere in some other form.

Further, a page to initiate a new call is but one of a number of types of messages that can be sent via the paging channel. Herein, messages that are sent via a paging channel may be generally referred to as "paging-channel messages." Thus, there may be a number of different types of paging-channel messages. For example, the various types of paging-channel messages may include system parameters messages, access parameters messages, CDMA channel list messages, order messages, channel assignment messages, data burst messages, authentication messages, shared secret data (SSD) update messages, feature notification messages (FNMs), extended system parameters messages, extended neighbor list messages, status request messages, service redirection messages, general page messages, global service redirection messages, and/or Temporary Mobile Subscriber Identity (TMSI) assignment messages, among other possibilities.

In an example embodiment, a base station may be configured to create a general page message (GPM) that includes multiple paging-channel messages, such that multiple mobile stations can be paged using a single page message. (For clarity, each individual page to a mobile station that is included in a larger "general page message" may be referred to as a "page record" or "paging-channel message.") Before transmission, page records may be concatenated so that more page records may be included in a page message than otherwise could be. For example, in some implementations, one concatenation level may correspond to concatenation that allows up to eight page records to be concatenated in a single GPM. Additionally or alternatively, other concatenation levels may correspond to concatenation of pages in a GPM such that at least five page records may be included in a single GPM. Other concatenation levels and/or concatenation techniques are also possible.

In an exemplary embodiment, concatenation may be applied only to types of paging-channel messages that are being sent to specific mobile stations, such as pages to initiate voice calls and FNMs, but not to other types of paging-channel messages, such as overhead messages. However, it should be understood that in other embodiments, concatenation may not be limited to any particular type or types of paging-channel messages.

Without concatenation, a single page message that occupies two half frames in the paging channel, typically does not include more than four page records. In comparison, when concatenation is applied, an example concatenation level may allow for a GPM in which two page records are concatenated to be sent in two to three half frames, which in turn may allow for five page records to be sent in a single timeslot. Applying additional concatenation, another possible concatenation level may allow for two to eight page records to be concatenated in a GPM that is sent in two half frames, which in turn may allow a base station to transmit eight page records in a timeslot.

When multiple page records are concatenated in a GPM, some information which is typically included in a page is not repeated for each page record. For example, length bits, overhead bits, CRC bits, and reserved bits, are not repeated for each page record in a GPM. However, there may be a performance tradeoff since more page records are being concatenated into the same 80 ms slot. Thus, while concatenating page records into a GPM may reduce the load on the paging channel, thereby helping to reduce paging channel occupancy (PCO), concatenation may also result in some page records failing to reach their intended mobile stations, thus reducing the paging-success rate (PSR).

Further, there may be scenarios where a certain type or types of paging-channel messages account for disproportionate amount of the total PCO in a sector. For example, FNMs, which indicate the existence of a voicemail, may be sent to mobile stations when the mobile stations send location update messages. Specifically, if a first attempt to send an FNM to a mobile station is unsuccessful, a switch may make a subsequent attempt to send the FNM the next time that the mobile station sends a location update message. Further, mobile stations may be configured to send a location update message in response to entering a new paging zone. Therefore, the number of FNMs being sent in a border sector of a zone may be comparatively much greater than the number of FNMs being sent in other sectors (e.g., non-border sectors). As a result there may be scenarios where the transmission of a large number of FNMs in a border sector could lead to a high PCO in the sector, and possibly even cause paging overload.

Accordingly, in an exemplary embodiment, a network entity or entities, such as a RAN component 201 shown in FIG. 2, may be configured to vary the level of concatenation used for a particular type of paging-channel message in a given sector, based on the amount of the PCO that is attributable to that particular type of paging-channel message. For example, a base station may be configured to determine whether to apply concatenation to a given type of paging-channel message based on the "message-type PCO" for the particular type of paging-channel message. The base station may then include a paging-channel message of the particular type in a GPM corresponding to the determined amount of concatenation (and/or could simply send concatenate and send each paging-channel message of the particular type, without including the messages in a GPM or GPMs).

As a specific example, exemplary RAN component 201 may include program logic 210 that is executable by processor 204 to: (a) determine a message-type PCO for a first of a plurality of types of paging-channel messages in a coverage area of a RAN in which a plurality of types of paging-channel messages may be sent via the paging channel of a given coverage area, (b) use the message-type PCO as a basis to select a concatenation level to be used in the coverage area for the first type of paging-channel message, and (c) apply concatenation according to the selected concatenation level to paging-channel messages of the first type in the coverage area.

In a further aspect, RAN component 201 may include or have access to a message-type PCO database 212. Message-type PCO database 212 may include database entries on a per-sector basis that indicate the most-recently measured message-type PCO for at least one type of paging-channel message in a given sector. Accordingly, the RAN component 201 may be configured to query the message-type PCO database 212 to obtain the PCO for the sector in which the mobile station is located. Further, message-type PCO database 212 may include data mapping particular message-type PCO levels or ranges of PCO levels to corresponding concatenation levels. Accordingly, the RAN component 201 may query message-type PCO database 212 to retrieve the concatenation level to use for a particular type of paging-channel message in a particular sector.

In a further aspect, RAN component 201 may be configured to maintain or update the message-type PCO database 212 by periodically determining the message-type PCO level for one or more types of paging-channel messages in each sector served by the base station, and storing the determined message-type PCO levels in the database entries corresponding to the respective sectors. The base station may also be configured to access the data mapping a particular message-type PCO level to a particular concatenation level in order to determine the concatenation level to be applied to the corresponding type of paging-channel message.

Figure 3:
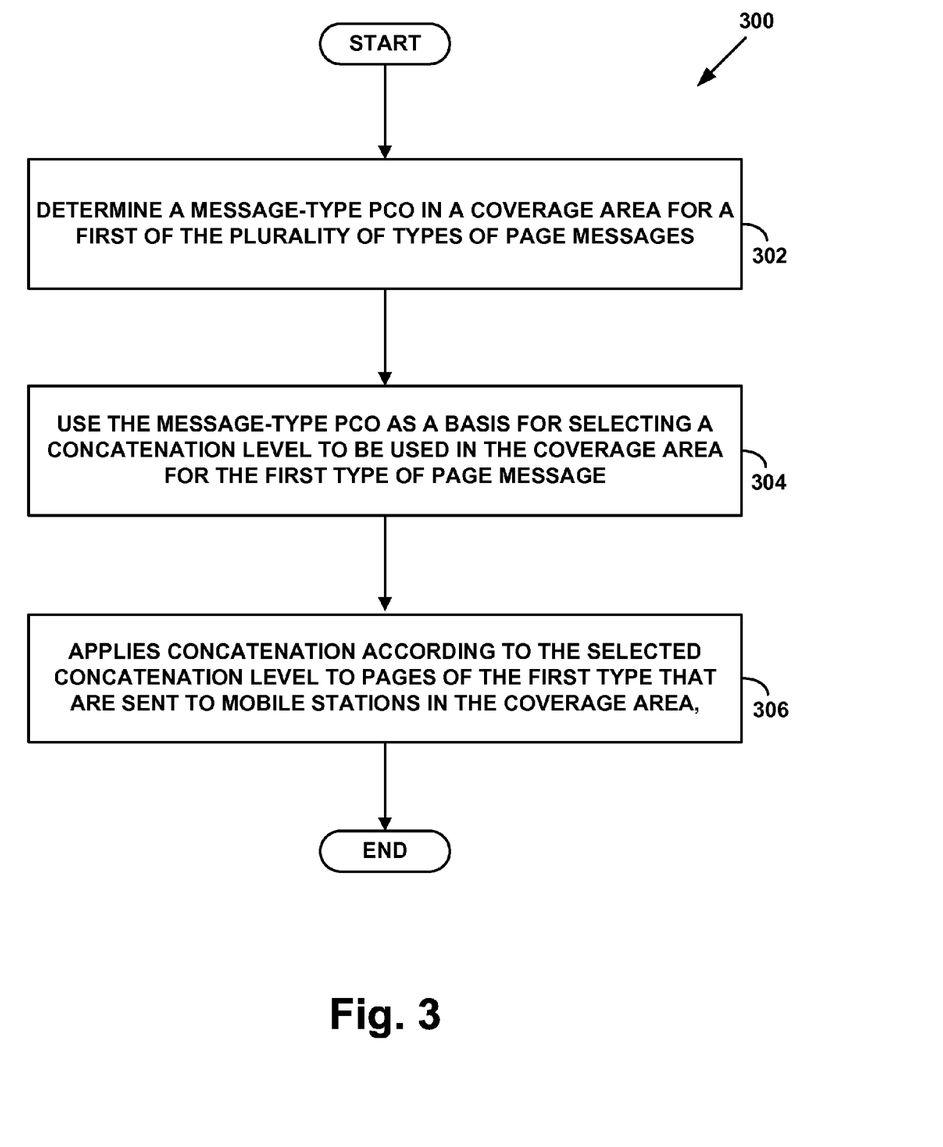
FIG. 3 is a flow chart illustrating a method for managing paging-channel resources, according to an exemplary embodiment.

FIG. 3 is a flow chart illustrating a method 300 for managing paging-channel resources, according to an exemplary embodiment. Using the method illustrated in FIG. 3, an access network may dynamically adjust how much concatenation is applied to a given type of paging-channel message, depending upon the message-type PCO for the particular type of paging-channel message.

In particular, method 300 involves a base station determining a message-type PCO in a coverage area for a first of the plurality of types of page messages, as shown by block 302. The base station may then use the message-type PCO as a basis for selecting a concatenation level to be used in the coverage area for the first type of page message, as shown by block 304. In an exemplary embodiment, the concatenation level is selected from a plurality of possible concatenation levels (e.g., two or more possible concatenation levels, depending upon the particular implementation). The base station then applies concatenation according to the selected concatenation level to pages of the first type that are sent to mobile stations in the coverage area, as shown by block 306.

Further, a base station may repeat method 300 periodically, in order to dynamically update the concatenation level for a given type of paging-channel message in order to account for variations in its message-type PCO. In such an embodiment, the period with which method 300 is repeated may vary, depending upon the particular implementation.

It should be understood that when a concatenation level is determined for a particular type of paging-channel message, the corresponding amount of concatenation may be applied to that type of paging-channel message, but not necessarily to other types of paging-channel messages in the coverage area. This may result, in some embodiments, in GPMs being sent with varying amounts of concatenation, within the same coverage area. By doing so, a base station may concatenate one type of paging-channel message (FNMs, for example), without concatenating other types of paging-channel messages (voice pages, for example). As such, paging-channel messages having one concatenation level may be grouped in GPMs having that concatenation level, while paging-channel message having another concatenation level may be grouped in different GPMs having the other concatenation level.

Additionally or alternatively, method 300 may be repeated in response to a base station determining that the message-type PCO for a given type of paging-channel message has changed by a certain amount. In such an embodiment, the base station may monitor or periodically check whether the message-type PCO for the given type of paging-channel message has changed.

Further, in some embodiments, a base station could perform the foregoing functions separately for each of a number of different type of paging-channel messages. As such, a base station could dynamically update the respective concatenation level for each of a number of different types of paging-channel messages.

Various techniques may be used to determine the message-type PCO at block 302. In some embodiments, the message-type PCO for a given type of page message may be determined by calculating the percentage of the total paging-channel capacity in a coverage area that is utilized for the given type of page message. As an example, if 35% of the paging channel's total bandwidth (e.g., both used and unused bandwith) is being taken up by FNMs, then the message-type PCO for FNMs may be determined to be 35%. For instance, the base station may determine the message-type PCO for FNMs by adding the total size of the scheduled FNMs (e.g., the total bandwidth required for transmission of the FNMs) in the next time slot. The message-type PCO for FNMs may then be calculated as the ratio of the total size as compared to the 1528 bits available in a typical 80 ms paging-channel timeslot (where data is transmitted at 9.6 kb/sec).

In other embodiments, the message-type PCO for a given type of page message may be determined by calculating the percentage of the total PCO in a coverage area that corresponds to the given type of page message. For example, consider a scenario where the total PCO, due to all types of page messages is 90%, and where 30% of the paging channel's total bandwidth is being taken up by FNMs. In this scenario, if the message-type PCO is calculated as the percentage of the total PCO, then the message-type PCO would be 33%.

To determine the total PCO in a given coverage area, the base station may analyze the number and/or size of the paging-channel messages that are scheduled for a given timeslot on the paging channel, as well based on the number and/or size any overhead messages (ACK messages, etc.) scheduled for transmission during the timeslot. The base station may then calculate the total bandwidth required for transmission of all the scheduled paging-channel messages of a given type to determine and the total bandwidth required for transmission of all overhead messages in the timeslot. (In practice, overhead messages typically occupy the majority of the available paging-channel bandwidth.) The base station may then calculate the total PCO in the sector as the sum of the bandwidth totals for page records and overhead messages in the timeslot. This sum, indicating a total usage of paging-channel resources for all types of paging-channel messages, may then be used as the total PCO. Alternatively, the total PCO may be calculated as the ratio of the total bandwidth for all types of paging-channel messages as compared to the total available bandwidth on the paging channel.

In some embodiments, a message-type PCO and/or the total PCO may be determined based on pages and/or overhead messages that are scheduled for a future timeslot, which is typically the next-occurring timeslot (although later occurring timeslots are also possible). As one specific example, the base station may determine the message-type PCO for FNMs by adding the total size of the scheduled FNMs (e.g., the total bandwidth required for transmission of the FNMs) in the next time slot. And as another alternative, this sum may be subtracted from the 1528 bits available to determine how many additional pages may be sent in the timeslot. This determination may be based on the typical page record size of 72 bits (plus addressing bits) for each page record.

In other embodiments, step of determining the message-type PCO for a given type of paging-channel message may involve determining the historical message-type PCO in a sector. For example, the base station may determine the actual message-type PCO for each timeslot by determining, and store a record of the message-type PCO over a certain number of past time slots. This historical message-type PCO information may then be used to estimate the message-type PCO that is expected in future time slots. For instance, the message-type PCO may be calculated as a moving average of the message-type PCO with a window size of a predetermined number of timeslots (e.g., the previous ten timeslots). Alternatively, the base station may determine an average message-type PCO periodically by, for example, calculating the average message-type PCO over ten timeslots once every ten timeslots. Other techniques for determining the message-type PCO are also possible.

It should be understood that other techniques and/or variations on the above-described techniques for determining the message-type PCO for a given type of paging-channel message are also possible.

The function of using the determined PCO to select a concatenation level may also be accomplished using various techniques. In an exemplary embodiment, a concatenation level is typically selected such that less concatenation is applied to paging-channel messages when the PCO is higher and more concatenation is applied to paging-channel messages when the PCO is lower.

In some implementations of method 300, a base station may select a concatenation level by determining whether or not the message-type PCO for the first type of page message is greater than a threshold. Then, if the message-type PCO for the first type of page message is greater than the threshold, the base station may select a concatenation level such that page messages of the first type are concatenated. On the other hand, if the message-type PCO for the first type of page message is less than the threshold, then the base station may select a concatenation level that corresponds to no concatenation.

As a specific example, if the determined message-type PCO for FNMs is above a threshold level, then a first concatenation level using less concatenation (such as FR4916B) or no concatenation may be selected. On the other hand, if the determined message-type PCO for FNMs is below the threshold level, then a second concatenation level applying more concatenation may be selected, such as a concatenation in which five to eight FNMs can be included in a single GPM.

Note that when the message-type PCO is equal to the threshold, paging-channel message of the first type may or may not be concatenated, depending upon the particular implementation. Further, note that the threshold level for deciding between the two concatenation levels may be selected as a matter of engineering design choice.

More granular concatenation-level selection schemes are also possible. For example, multiple message-type PCO ranges may be defined and/or selection may be made from multiple concatenation levels. For instance, in some implementations of method 300, a base station may select the concatenation level for the first type of paging-channel message by selecting from between three or more possible concatenation levels.

Figure 4A:
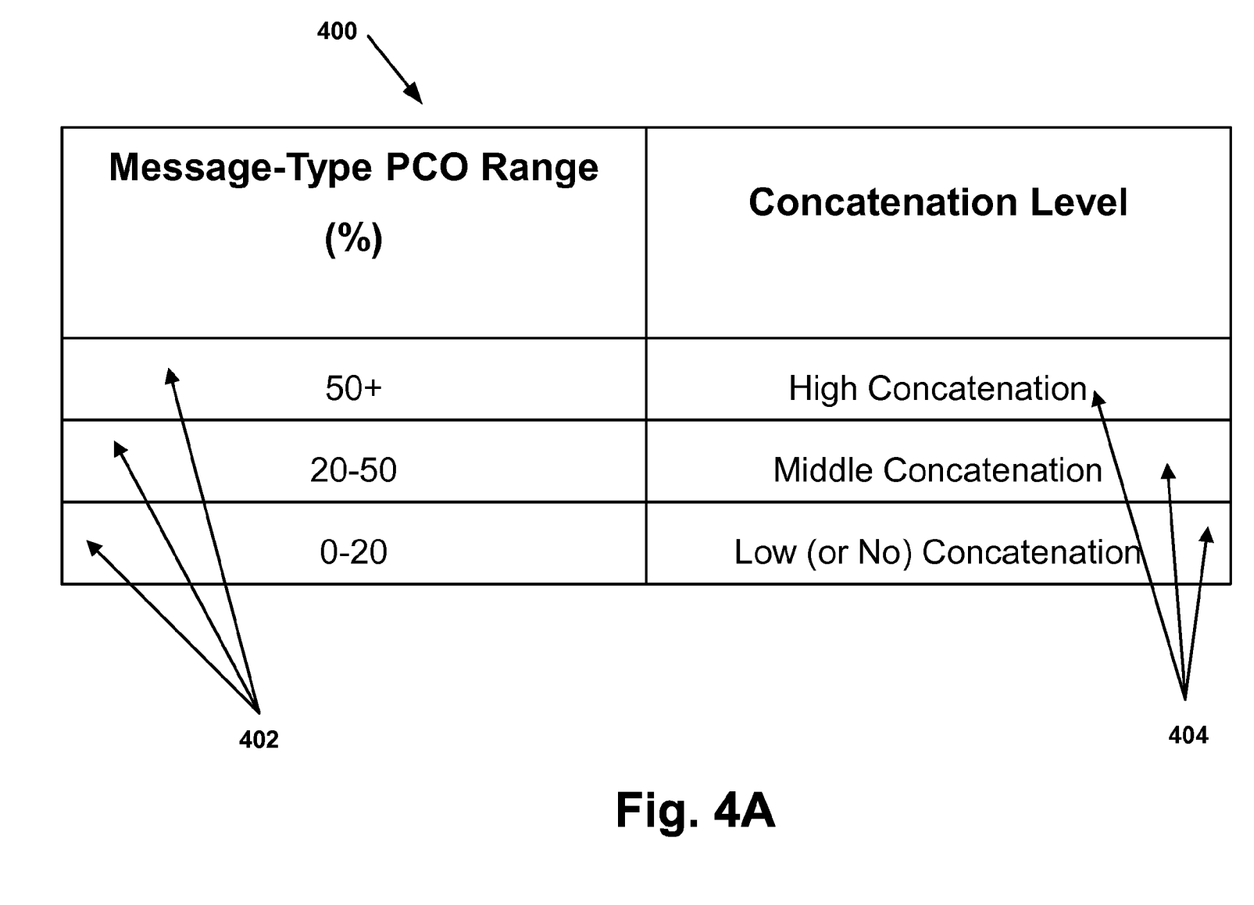
FIG. 4A is a table showing a mapping of message-type paging-channel occupancy ranges to concatenation levels, according to an exemplary embodiment.

As a more specific example, FIG. 4A is a table 400 showing a mapping of message-type PCO ranges 402 to concatenation levels 404, according to an exemplary embodiment. Specifically, FIG. 4A shows a mapping of message-type PCO ranges for FNMs in an embodiment where the message-type PCO is measured as the percentage of the total bandwidth (both available bandwidth and in-use bandwidth) used for FNMs.

In FIG. 4A, message-type PCO ranges 402 for FNMs in a given sector are defined for 0-20%, 20-50%, and 50% and up. As shown message-type PCO levels of 50% or higher correspond to a high concatenation level for FNMs (e.g., where the size of the FNMs is reduced by a greater amount than lower concatenation levels), PCO levels from 20-50% correspond to a middle concatenation level, and message-type PCO levels from 0-20% correspond low (or possibly no) concatenation. It should be understood that in general, ranges of message-type PCO levels and/or the corresponding concatenation levels may be selected as a matter of engineering design choice.

Figure 4B:
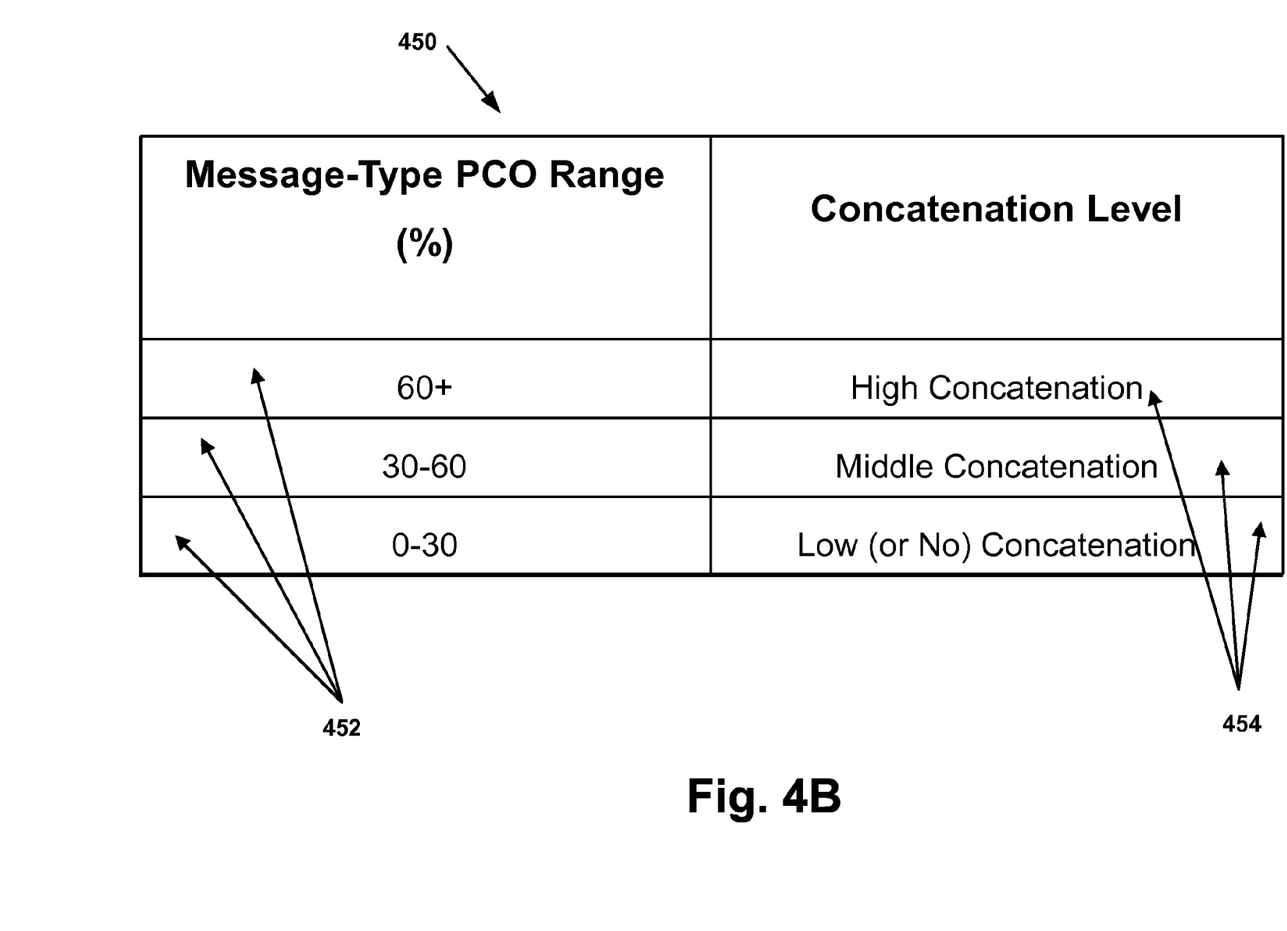
FIG. 4B is another table showing a mapping of message-type paging-channel occupancy ranges to concatenation levels, according to an exemplary embodiment.

As another specific example, FIG. 4B is another table 450 showing a mapping of message-type PCO ranges 452 to concatenation levels 454, according to an exemplary embodiment. Specifically, FIG. 4B shows a mapping of message-type PCO ranges for FNMs in an embodiment where the message-type PCO is measured as the percentage of the in-use bandwidth that is used for FNMs.

In FIG. 4B, message-type PCO ranges 452 for FNMs in a given sector are defined for 0-30%, 30-60%, and 60%+. More specifically, message-type PCO levels of 60% or higher correspond to a high concatenation level for FNMs (e.g., where the size of the FNMs is reduced by a greater amount than lower concatenation levels), PCO levels from 30-60% correspond to a middle concatenation level, and message-type PCO levels from 0-30% correspond low (or possibly no) concatenation. It should be understood that in general, ranges of message-type PCO levels and/or the corresponding concatenation levels may be selected as a matter of engineering design choice.

As noted above, when implemented to dynamically adjust the concatenation of FNMs, an exemplary method may be particularly useful in border sectors of paging zones. Accordingly, an exemplary method may be implemented in border coverage areas in a paging zone. Further, in some RANs, an exemplary method may only be implemented for FNMs in border sectors of paging zones, and not in other sectors of the RAN.

Further, there may be scenarios where a disproportionate amount of FNMs are sent in a sector that is not a border sector of a paging zone. For example, there may be "coverage holes" in a RAN where service is unavailable. When a mobile station is first able to find a signal after being unable to do so for a period of time, it may send a registration message, in a similar manner as it does when entering a new paging zone. Accordingly, for similar reasons that large a large number of FNMs may be sent in a border sector of a paging zone, a large number of FNMs may be sent in coverage areas that border a coverage hole. As such, an exemplary method may also be particularly useful to implement dynamic concatenation of FNMs in coverage areas that border coverage holes. Other examples are also possible.

Exemplary embodiments of the present invention have been described above. Those skilled in the art will understand, however, that changes and modifications may be made to these embodiments without departing from the true scope and spirit of the invention, which is defined by the claims.

I claim:

1. A computer-implemented method comprising:
determining, at a radio access network (RAN) that is operable to send a plurality of types of messages via a paging channel in a coverage area, a message-type paging channel occupancy (PCO) for a first of the plurality of types of paging-channel messages in the coverage area, wherein determining the message-type PCO for the first type of paging-channel message comprises determining a percentage of a total paging-channel capacity in the coverage area that is utilized for the first type of page message;
using the message-type PCO as a basis for selecting a concatenation level to be used in the coverage area for the first type of paging-channel message, wherein the concatenation level is selected from a plurality of possible concatenation levels; and
applying concatenation according to the selected concatenation level to paging-channel messages of the first type in the coverage area.

2. The method of claim 1, wherein selecting the concatenation level for the first type of paging-channel message comprises selecting from between three or more possible concatenation levels.

3. A computer-implemented method comprising:
determining, at a radio access network (RAN) that is operable to send a plurality of types of messages via a paging channel in a coverage area, a message-type paging channel occupancy (PCO) for a first of the plurality of types of paging-channel messages in the coverage area, wherein determining the message-type PCO for the first type of paging-channel message comprises determining a percentage of a total PCO that is attributable to the message-type PCO for the first type of paging-channel message;
using the message-type PCO as a basis for selecting a concatenation level to be used in the coverage area for the first type of paging-channel message, wherein the concatenation level is selected from a plurality of possible concatenation levels; and
applying concatenation according to the selected concatenation level to paging-channel messages of the first type in the coverage area.

4. A computer-implemented method comprising:
determining, at a radio access network (RAN) that is operable to send a plurality of types of messages via a paging channel in a coverage area, a message-type paging channel occupancy (PCO) for a first of the plurality of types of paging-channel messages in the coverage area;
using the message-type PCO as a basis for selecting a concatenation level to be used in the coverage area for the first type of paging-channel message, wherein the concatenation level is selected from a plurality of possible concatenation levels; and
applying concatenation according to the selected concatenation level to paging-channel messages of the first type in the coverage area;
wherein using the message-type PCO as a basis for selecting the concatenation level for the first type of paging-channel message comprises:
determining whether or not the message-type PCO for the first type of paging-channel message is greater than a threshold;
if the message-type PCO for the first type of paging-channel message is greater than the threshold, then selecting a concatenation level such that paging-channel messages of the first type are concatenated; and
if the message-type PCO for the first type of paging-channel message is less than the threshold, then selecting a concatenation level that corresponds to no concatenation.

5. A computer-implemented method comprising:
- determining, at a radio access network (RAN) that is operable to send a plurality of types of messages via a paging channel in a coverage area, a message-type paging channel occupancy (PCO) for a first of the plurality of types of paging-channel messages in the coverage area, wherein the first type of paging-channel messages are feature notification messages;
- using the message-type PCO as a basis for selecting a concatenation level to be used in the coverage area for the first type of paging-channel message, wherein the concatenation level is selected from a plurality of possible concatenation levels; and
- applying concatenation according to the selected concatenation level to paging-channel messages of the first type in the coverage area.

6. The method of claim 5, wherein the coverage area is a border sector in a paging zone.

7. The method of claim 5, wherein the coverage area is a border sector to a coverage hole in the RAN.

8. A non-transitory computer readable medium having stored therein instructions that are executable to cause a RAN to perform functions comprising:
- determining a message-type paging channel occupancy (PCO) for a first of a plurality of types of paging-channel messages in a coverage area of a radio access network (RAN), wherein the RAN is operable to send the plurality of types of paging-channel messages via a paging channel in the coverage area, wherein the first type of paging-channel messages are feature notification messages;
- using the message-type PCO as a basis for selecting a concatenation level to be used in the coverage area for the first type of paging-channel message, wherein the concatenation level is selected from a plurality of possible concatenation levels; and
- applying concatenation according to the selected concatenation level to paging-channel messages of the first type in the coverage area.

9. The non-transitory computer readable medium of claim 8, wherein determining the message-type PCO for the first type of paging-channel message comprises determining a percentage of a total paging-channel capacity in the coverage area that is utilized for the first type of page message.

10. The non-transitory computer readable medium of claim 8, wherein determining the message-type PCO for the first type of paging-channel message comprises determining a percentage of a total PCO that is attributable to the message-type PCO for the first type of paging-channel message.

11. The non-transitory computer readable medium of claim 8, wherein using the message-type PCO as a basis for selecting the concatenation level for the first type of paging-channel message comprises:
- determining whether or not the message-type PCO for the first type of paging-channel message is greater than a threshold;
- if the message-type PCO for the first type of paging-channel message is greater than the threshold, then selecting a concatenation level such that paging-channel messages of the first type are concatenated; and
- if the message-type PCO for the first type of paging-channel message is less than the threshold, then selecting a concatenation level that corresponds to no concatenation.

12. The non-transitory computer readable medium of claim 8, wherein selecting the concatenation level for the first type of paging-channel message comprises selecting from between three or more possible concatenation levels.

13. A radio-access-network system comprising:
- a non-transitory computer readable medium;
- program instructions stored on the non-transitory computer readable medium an executable by at least one processor to:
  - determine a message-type paging channel occupancy (PCO) for a first of a plurality of types of paging-channel messages in a coverage area of a radio access network (RAN), wherein the RAN is operable to send the plurality of types of paging-channel messages via a paging channel in the coverage area, wherein the first type of paging-channel messages are feature notification messages;
  - use the message-type PCO as a basis to select a concatenation level to be used in the coverage area for the first type of paging-channel message, wherein the concatenation level is selected from a plurality of possible concatenation levels; and
  - apply concatenation according to the selected concatenation level to paging-channel messages of the first type in the coverage area.

14. The system of claim 13, wherein the message-type PCO for the first type of paging-channel message is based on a percentage of a total paging-channel capacity in the coverage area that is utilized for the first type of page message.

15. The system of claim 13, wherein the message-type PCO for the first type of paging-channel message is based on a percentage of a total PCO in the coverage area that is attributable to the message-type PCO for the first type of paging-channel message.

16. The system of claim 13, wherein the system is implemented in a base station.

17. The system of claim 13, wherein the system is implemented in a switch.

* * * * *